United States Patent [19] [11] 4,104,433
Kirk et al. [45] Aug. 1, 1978

[54] FLAME RETARDANT, NON-DRIPPING COATING COMPOSITION COMPRISING CROSSLINKABLE COPOLYMERS OF DIHYDRIC PHENOLS WITH BIS CHLOROALKYL OXETANES

[75] Inventors: James P. Kirk, Seeley Lake, Mont.; Robert L. Wear, West St. Paul, Minn.

[73] Assignee: Minnesota Mining and Manufacturing Company, St. Paul, Minn.

[21] Appl. No.: 645,956

[22] Filed: Jan. 2, 1976

[51] Int. Cl.² .................... C08G 65/00; B32B 25/08; B32B 25/10; B32B 27/12
[52] U.S. Cl. .................................. 428/245; 528/174; 260/DIG. 24; 260/30.4 R; 260/33.8 R; 260/61; 428/260; 428/290; 428/921
[58] Field of Search ............... 428/245, 290, 921, 260; 260/DIG. 24, 61, 47 R, 2 X A

[56] References Cited

U.S. PATENT DOCUMENTS

| | | |
|---|---|---|
| 3,809,681 | 5/1974 | Musser et al. ............... 260/DIG. 24 |
| 3,846,375 | 11/1974 | Wear ..................................... 260/61 |
| 3,875,257 | 4/1975 | Musser et al. ............... 260/DIG. 24 |

Primary Examiner—Joseph L. Schofer
Assistant Examiner—Peter F. Kulkosky
Attorney, Agent, or Firm—Cruzan Alexander; Donald M. Sell; Warren R. Bovee

[57] ABSTRACT

Coating compositions for polymeric substrates which reduce or eliminate dripping of the substrates by forming a cohesive, intumescent, adherent char during exposure to flame. The coating compositions comprise halogenated polymers containing oxacyclobutane units, especially the polycondensation product of tetrahalobisphenol and bishaloalkyl oxetane monomers.

9 Claims, No Drawings

FLAME RETARDANT, NON-DRIPPING COATING COMPOSITION COMPRISING CROSSLINKABLE COPOLYMERS OF DIHYDRIC PHENOLS WITH BIS CHLOROALKYL OXETANES

The present invention relates to char-forming, flame-retardant coating compositions containing crosslinkable polymers formed by the polycondensation reaction between halogen substituted dihydric phenols and bis-chloroalkyl oxetane compounds. Polymeric substrates can be coated with the flame-retardant, crosslinkable, coating compositions of this invention. One aspect of the invention relates to a method of rendering polymeric substrates flame retardant and resistant to dripping, when exposed to flame, by coating these polymeric substrates with a film of the char-forming, flame-retardant coating composition of this invention and crosslinking the coating.

Various materials have been used to impart flame retardant properties to polymeric materials. These retardant materials are of two types, i.e., either additive or reactive, and are blended into or reacted with the polymeric material which is to be made flame retardant. Common additives are phosphorous or compounds containing bromine, chlorine, phosphorus, or mixtures of these, and are incorporated into the polymers during processing. Antimony trioxide and tetrabromobisphenol A are also used as additives with beneficial effect. A flame retardant agent can affect the burning of a solid in one or more ways, such as by (1) interfering with the combustion reaction, (2) making the products of pyrolysis less flammable, (3) reducing the transfer of heat from the flame to the solid, or (4) by reducing the rate of diffusion of pyrolysis products to the flame front.

Bromine based materials have been found effective as flame retardants and are of three general classes: aliphatic, cycloaliphatic, and aromatic. Aliphatic and cycloaliphatic bromine additives are among the most efficient flame retardants available; however, their use has been limited by unsatisfactory processing properties, e.g. processing temperatures must generally be below 200° C. maximum, and high drip characteristics.

The requirements of a flame retardant material can be related to flame spread, smoke and toxic gas emission, and drip characteristics. The drip characteristics of organic polymeric materials or plastics are of great importance since many organic polymeric materials tend to drip burning droplets when exposed to flame and these flaming droplets help spread the fire. In addition, it is most important that the additives which are employed to render materials flame retardant not drastically affect the fundamental characteristic physical properties of the materials in which they are incorporated.

The present invention provides flame retardant polymeric films which are char-forming and non-dripping when exposed to flame. These materials are provided by the application of a unique, flame-retardant, crosslinked polymer as a coating on polymeric film and sheet substrates. The polymers preferred for use in the invention comprise crosslinkable and crosslinked, halogenated, oxetane-containing polymers.

Polymers containing the oxacyclobutane ring linked to an aliphatic chain through the quaternary carbon atom are known. A discussion of the general chemistry of oxetanes can be found in *Heterocyclic Componds with Three- and Four-Membered Rings*, Arnold Weissberger, Editor, Part Two, Chapter IX, p. 983 (Interscience Publishers, 1964). Film-forming polymers containing the condensation product of tetrabromobisphenol A and bischloromethyl oxetane have been disclosed in U.S. Pat. No. 3,846,375, issued Nov. 5, 1974.

The polymers used in this invention are obtained by reacting a salt of a halogenated aromatic dihydric phenol with a stoichiometric or slightly excessive amount of an oxetane containing monomer, thereby forming a polycondensation polymer which can be subsequently crosslinked by the application of heat in the presence of a crosslinking agent. In the present invention the uncrosslinked resins are blended with a solvent to provide the appropriate solids content and viscosity for coating, and a curing or crosslinking agent is added. Polymeric substrates can be coated with these solutions, and heated briefly to remove solvent and to crosslink the polymer coating. The coated substrates of the present invention tend to form an intumescent, cohesive char on exposure to flame rather than melting and dripping as characteristic of uncoated substrates. Thus the coatings of the present invention can prevent or retard the spread of fire.

The coatings of this invention are unique in that they accomplish this flame retardant function without significantly affecting the characteristic properties of the substrate. Further, the coating method of the present invention does not require sophisticated processing techniques for mixing or incorporating a flame retardant additive as does the incorporation of additives directly in the polymer according to the prior art methods.

The resins preferred for use in the present invention are condensation polymers of halogenated dihydric phenols and oxetane-containing monomers. The oxetane compounds used to react with the phenolic compounds are preferably monomers with 3,3-bis-substituted alkyl groups containing an anionforming radical on the terminal carbon atom, such as a halogen radical, so that two moles of a salt are split out when each dihydric phenol/oxetane monomer reaction takes place. A preferred oxetane containing monomer can be illustrated by the structural formula

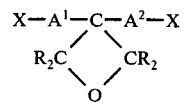

wherein $A^1$ and $A^2$ are lower aliphatic radicals containing 1 to 6 carbon atoms, preferably methylene ($—CH_2—$);

X is halogen; and

R is independently selected to be hydrogen or $C_1$ to $C_6$ alkyl. Hydrogen is the preferred substituent. The R groups are selected to avoid stearic hindrance, and the X substituents are preferably attached to the terminal carbon atom of $A^1$ and $A^2$.

A particularly preferred oxetane monomer is the compound wherein X is chlorine and the lower aliphatic radicals are methylene, i.e., bischloromethyl oxetane (BCMO).

The halogenated dihydric phenols useful in the present invention are compounds represented by the general formula

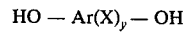

$$HO — Ar(X)_y — OH$$

wherein
- Ar is a monocyclic aromatic nucleus or a polycyclic aromatic nucleus,
- X is a halogen sustituent located on the aromatic nucleus, and
- y is an integer from 1 to 8, preferably from 1 to 4 and most preferably 4.

Preferred compounds are halogen substituted polyaromatic dihydric phenols. A preferred polyaromatic nucleus comprises two independent aromatic groups, preferably monocyclic and preferably joined by a bridging means. The bridging means generally comprises a symmetrical or asymmetrical divalent organic bridging radical, e.g. an alkylene group (typically —$CR_2$— where R is H or lower alkyl) or other hydrocarbon residue, oxygen ( — O — ), carbonyl ( — CO — ), sulfide ( — S — ), sulfone ( — $SO_2$ — ), etc., the hydrocarbon and sulfone bridges being preferred. Other suitable polycyclic aromatic nuclei can be based on the biphenyl structure, Ph-Ph, where Ph is phenyl. When the hydrocarbon "bridge" is alkylene (i.e., disubstituted alkane), the 2-substituted propane bridge (e.g. —$C(CH_3)_2$—) is a particularly practical example of a suitable bridge, since these bisphenol A-type compounds are readily available. Other suitable bridging radicals include divalent radicals derived from cyclohexane, 2-(4-methylcyclohexyl)propane, ethyl cyclohexane, norbornane, methane, diphenyl methane, diperfluoromethylmethane, and mono-isopropylmethane.

The condensation reaction is stoichiometric, thus substantially equimolar amounts of the monomers should be present in the starting materials, although a slight excess of the oxetane containing monomer will also provide desirable results. Due to the stoichiometric polymerization, the resulting polymer, excluding end groups, contains alternate dihydric phenol and oxetane-containing moieties.

Preparation of the preferred copolymers of this invention can be illustrated by reference to the following reaction scheme:

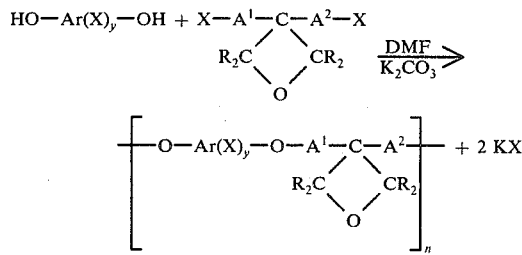

wherein
- $A^1$ and $A^2$ are lower aliphatic radicals containing 1 to 6 carbon atoms, preferably methylene (— $CH_2$ —),
- X is halogen, preferably bromine or chlorine, and can be the same or different,
- R is preferably hydrogen or can be lower alkyl of 1 to 6 carbon atoms and can be the same or different,
- n is an integer representing the degree of polymerization (i.e. the average number of units per polymer molecule),
- Ar is a monocyclic aromatic nucleus or a polycyclic aromatic nucleus, and
- y is an integer from 1 to 8, preferably from 1 to 4 and most preferably 4.

Preferred polymers of this invention can be obtained by reacting a salt of tetrahalo-bisphenol A with a stoichiometric or slight excess of bishaloalkyl oxetane to obtain a tetrahalo-bisphenol A:bishaloalkyl oxetane condensation polymer wherein the degree of polymerization, n, is such that the inherent viscosity of the polymer is at least about 0.1. Particularly preferred polymers can be prepared by reacting a salt of tetrachloro- or tetrabromo-bisphenol A with a stoichiometric or slight excess of bischloromethyl oxetane to obtain a tetrabromo- or tetrachloro-bisphenol A:bischloromethyl oxetane condensation polymer wherein the degree of polymerization, n, is such that the inherent viscosity of the polymer is at least about 0.1.

A typical reaction scheme for the information of these particularly preferred copolymers can be represented as follows:

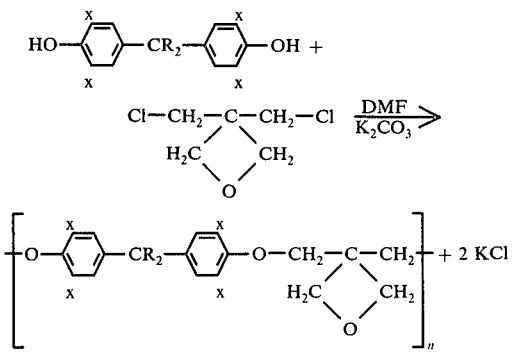

wherein
- x is chlorine or bromine,
- R is methyl, and
- n is an integer which represents the degree of polymerization.

In preparing the polymers useful in this invention, the degree of polymerization, n, is selected so that the inherent viscosity of the polymer is suitable for the preparation of coating compositions, and so that the polymer, when coated, will provide a coherent and flexible film.

Thus it has been found that the inherent viscosity should be at least about 0.1 so that the polymer will be suitable for coating applications. A convenient method of determining the inherent viscosity (IV) of the uncrosslinked polymers of the present invention utilizes calculations derived from relative viscosities measured with a U-tube viscometer (e.g. a Series 100 Cannon Fenske Viscometer).

A relative viscosity is determined by measuring the time taken for a solution consisting of the polymer, dissolved in a specified solvent, to flow past a delineated segment of the U-tube and dividing this measurement by the time taken for an identical volume of the pure solvent. The inherent viscosity of the solution is then calculated by the following equation:

$$\text{Inherent Viscosity} = \frac{\text{natural log of relative viscosity}}{\frac{\text{concentration in grams}}{100 \text{ ml of solution}}}$$

The procedure for obtaining relative viscosity data used in this invention was as follows. First, a sample of the solvent, i.e., 1,1,2,2-tetrachloroethane, was placed in the clean, dry viscometer which had been held at 30° C. The solvent was retained in the viscometer for 10 minutes to attain temperature equilibrium at 30° C. with the device. The measurement of flow rate was then taken. Next the process was repeated with a solution containing 0.25 gm. of polymer in 50 ml. of solution and the relative viscosity was calculated as indicated above. This procedure was repeated five times and the average of these relative viscosity measurements was used to calculate inherent viscosity according to the formula shown above. The above-described "inherent viscosity" calculations are often used as an indication of a molecular weight in the art of making and using film-forming polymers.

The halogenated oxetane-containing polymers can be coated onto polymeric films and crosslinked to provide a coated film having good flexibility and resistance to high temperature, i.e., they do not readily soften and melt at the combustion temperatures of common organic polymeric films. The oxetane ring exhibits behavior analogous to an epoxy (oxirane) ring in that catalytic and/or reactive crosslinking agents can be used to open the ring and link two or more chains together to form a crosslinked polymer. By way of example, polycarboxylic acid anhydrides and other polyfunctional compounds such as polyamines, polycarboxylic acids, polymercaptans, polyacid halides, and the like are capable of linking two or more oxetane sites. This crosslinking produces a three dimensional polymeric structure having increased heat resistance and solvent resistance. Surprisingly, it has been found that these crosslinked polymers do not melt or drip when exposed to flame, but produce an intumescent, cohesive, incombustible char which reduces the spread of flames and other hazards associated with dripping, flaming materials.

The oxetane rings in the present polymers can be activated by heating the polymers in the presence of a strong acid or Lewis acid catalyst or other oxetane ring opening catalysts. A particularly suitable catalytic crosslinking agent is a stannic chloride-acetonitrile complex. These compounds are disclosed in the literature and can be prepared according to procedures outlined in an article by Janier-Dubry et al, *Bull. Soc. Chim. Fr.*, 1971, pp. 2816-2819; *Chemical Abstracts*, 75:118091g (1971).

Another method for crosslinking the oxetane-containing polymers of this invention involves the use of polyfunctional reactive co-curatives or crosslinking agents similar to those used in curing epoxides. The preferred polyfunctional reactive crosslinking agents are strongly acidic polycarboxylic acids, polycarboxylic acid anhydrides, and polycarboxylic acid chlorides. Polyamines are marginally operative, but not preferred. Several crosslinking agents are capable of bringing the uncrosslinked polymer rapidly to the crosslinked states. Among these are: 2,5-dichloroterephthalic acid and other acids wherein the acid hydrogen has been activated by an inductive or resonance effect (less acidic acids such as sebacic acid are less preferred), trimellitic anhydride, pyromellitic dianhydride, benzophenone-tetracarboxylic dianhydride, and trimesoyl chloride.

The crosslinked polymers of this invention are characterized by a significant increase in solvent resistance, e.g. no swelling or only slight swelling when immersed in chlorobenzene. Thus a thin film of a crosslinked polymer when immersed in a solvent for the uncrosslinked polymer, such as chlorobenzene, tetrahydrofuran or trichloroethylene, will generally exhibit a swell factor less than 2. Various methods of relating swell factor in solvents to the crosslink density of the polymer are known. Reference is made to "Encyclopedia of Polymer Science & Technology", Interscience Publishers, New York (1966), Volume 4, pages 333 and 334, when various methods of relating the swelling or solubility of a polymer in solvent to the crosslink density are described.

As in epoxide chemistry, oxetane-containing chains can be joined by a bridge derived from the reactive crosslinking agent as described in U.S. Pat. No. 3,846,375 at Column 7. The crosslinking reaction can take as long as two hours and often requires temperatures on the order of 180° C. However, reaction times can be shortened to 5 minutes or less, and temperatures of 150° C. can be used when the selection of crosslinking agent is optimized. One of the aforementioned catalytic crosslinking agents, i.e., a stannic chloride-acetonitrile complex can be used to provide an effective cure after 5 minutes at 150° C.

Polymers made according to this invention, prior to crosslinking, can be dissolved in solvents and solvent cast to form useful films. Examples of suitable solvents for solvent casting include chlorobenzene, trichloroethylene, tetrahydrofuran, s-tetrachloroethane, dioxane and mixtures of these solvents with each other and with other polar solvents such as dimethyl formamide. Films can be solvent cast which contain one or more of the previously mentioned catalytic or reactive crosslinking agents such as the stannic chloride-acetonitrile complex.

The preferred coating compositions of the present invention contain the polymers of this invention dissolved in a solvent in admixture with a crosslinking agent. Preferred polymers are the aforementioned tetrachloro- or tetrabromo bisphenol A: bischloromethyl oxetane polymers having an inherent viscosity greater than about 0.1. The useful inherent viscosity can vary over a wide range. With very low solids content, an inherent viscosity of about 1 would be suitable for certain coating applications. Inherent viscosities of less than about 0.1 have generally been found to be less suitable for film-forming coating solutions.

The amount of solvent can also vary over a wide range and is dependent on the viscosity required and the solids content desired for a particular application. Thus, a solids content of about 5% to 50% may be desired for certain applications depending on the inherent viscosity of the polymer, the type of coating method employed, and the thickness of the coating desired.

The amount of crosslinking agent to be used in the coating composition will depend on the type of agent employed and polymer concentration. Generally, catalyst concentrations in the range of 0.1 to 4% by weight of the polymer are satisfactory. Where a reactive crosslinking agent is employed, it has been found that the amount employed will vary from about 50 to 120% of the stoichiometric amount.

The solid uncured or uncrosslinked films will temporarily retian their substantially linear character at room temperature and moderately elevated temperatures. However, at temperatures above 100° C., e.g. 120°-180° C., crosslinking occurs, and the substantially linear material is converted to a crosslinked material which is not visibly affected by soaking in chlorobenzene and has good electrical and thermal properties.

Various coating techniques which are known in the art can be employed. Thus, the coating solution may be simply brushed onto the substrate or may be applied by other conventional coating techniques such as, for example, knife coating, gravure, or reverse roll coating.

The flame-retardant, char-forming coatings of the present invention can be applied with advantage to any substrate which is flammable or which will drip on being exposed to flame. Typical polymeric substrates are sheets or films of nylon, polyolefin, polycarbonate, polyurethane, polystyrene, polyester, polyethylene and cellulose acetate. It is also contemplated that the coating composition of the present invention can be used to advantage in combination with flame retardant films such as flame retardant polyester films.

A particularly useful flame retardant film comprises a flame-retardant ethylene terephthalate copolymer which is a copolyester of terephthalic acid, ethylene glycol and 3,3-[bis-2,4,6-tribromophenoxymethyl] oxetane and which contains about 10 weight percent of bromine.

In addition to continuous film or sheet substrates, the coating materials of this invention can be used to advantage with discontinuous subtrates such as fiber webs which may be woven webs or random weave webs made from fibrous polymeric materials.

The coatings of the present invention have been found to be of particular utility in preventing the dripping of films or sheets of polymeric film substrates up to about 0.3 mm thick. Generally, the substrates must be coated on one major surface with a coating thickness of from about 0.002 mm to about 0.03 mm. For thicker substrates it may be required to apply coatings to both sides of the substrate. Thus, for a 0.1 to 0.3 mm film substrate, it may be desirable to apply coatings of up to 0.03 mm on each major surface of the substrate to achieve maximum flame retardant or non-drip characteristics.

The flame retardant and char-forming, drip characteristics of coated films prepared according to the present invention are measured respectively by the Limited Oxygen Index (glass wrapped) test (sometimes referred to hereinafter as the L.O.I. test), and the Underwriters Laboratories Subject #94 Material Flammability Test (sometimes referred to hereinafter as the UL94 test).

The L.O.I. test determines the percentage of oxygen in a slowly rising stream of gas which is required to just sustain "candle type" burning of a vertically supported sample. This is a very sensitive test which is capable of distinguishing between various degrees of flammability.

In the L.O.I. test (which is a modification of ASTM test method D-2863-70), a test specimen having a length of from about 13 to 15 centimeters, and a width of about 5 centimeters is utilized. Because some prior art films tend to melt and drip away from flame, additional sample support is provided as follows: Glass cloth (e.g., Burlington Style 104, 2.025 mm thick, 325 gm/sq. m, WXF=60× 52) is attached to each side of the sample by heating the film edges with a soldering iron, and by running the iron down the middle of the sample length and across the width at about ⅓ and ⅔ of the way from the bottom of the sample. The glass cloth must be adhered well enough to prevent edge rollover. The excess glass cloth is then trimmed away and the sample is clamped vertically at its bottom end in a U-shaped clamp (thus bending the sample so that it has a U-shaped cross section which further stiffens the sample and causes it to remain vertical). The sample is placed (vertically) in the center of a glass column having a minimum height of about 45 centimeters in such a position that its top is at least 10 centimeters below the top of the column. The bottom of the column contains noncombustible material to mix and distribute evenly a mixture of oxygen and nitrogen entering at the base.

The gas mixture is adjustable so that various known blends of oxygen and nitrogen may be supplied. The L.O.I. value report for a given test sample is the lowest percentage (by volume) of oxygen in the mixture of oxygen and nitrogen which is required to sustain combustion of the sample sufficient to burn away the top 5 cm of the sample in 3 minutes. It is calculated according to the formula L.O.I. = $(100 \times O_2)/(O_2 + N_2)$ where $O_2$ is the volumetric flow rate of oxygen in cubic centimeters per second at the limiting concentration and $N_2$ is the corresponding flow rate of nitrogen in cubic centimeters per second at the limiting concentration. The test is accurate to approximately one L.O.I. number. An L.O.I. above 21, the percentage of oxygen in ordinary air at sea level, indicates flame retardancy. Higher L.O.I. values indicate greater flame retardancy. L.O.I. values above 22 are desirable if the sample is to be considered "flame-resistant."

To determine the L.O.I. of a given coated film, a sample is prepared and mounted in the apparatus and a gas mixture containing known proportions of oxygen and nitrogen (expressed in percent by volume) is introduced into the column so that it is moving up and around the sample at a flow rate of 3 to 5 cubic centimeters per second. A flame is applied to the top of the sample until it is well lit and the entire top is burning (if this is possible in the atmosphere being used) and the flame is then removed. Several runs are made on samples of the same coated film (varying the content of oxygen in the gas mixture by one percent increments) until the L.O.I. value has been determined. The sample is observed to determine whether the top 5 cm are burned away in three minutes. If this occurs, the volume of oxygen must be reduced until the burning time exceeds 3 minutes.

The UL94 test provides a method for rating the drip characteristics and self-extinguishing properties of a specimen ignited and held vertically above a portion of dry absorbent surgical cotton located about 30 cm below the test specimen.

In the test, specimens having a length of 127 mm, a width of 12.7 mm and any thickness are utilized. If the thickness of the specimens varies by more than 12.7 mm, then specimens each having the minimum, the maximum and an intermediate thickness are tested.

A burner is lighted and adjusted so that it has a 19 mm blue flame. The flame is placed under the center of the lower end of the test specimen for 10 seconds. It is then withdrawn and the duration of flaming of the specimen measured. When flaming ceases, the test flame is immediately placed again under the specimen for 10 seconds and then withdrawn. The duration of flaming is again measured. The flame is applied a total of two times to each specimen. The average duration of flaming is then determined. During each test an observation is made as to whether or not the specimen drip flaming particles that ignite the cotton.

Materials are classified SE-O (now designated V-O) if the flame from ignited specimens dies within an average of 5 seconds, and the specimens do not drip flaming particles that ignite the cotton. Materials are classified SE-I (now designated V-1) if the flame from ignited specimens dies within an average of 25 seconds, and the specimens do not drip flaming particles that ignite the cotton. Materials are classfied SE-II (now designated V-2) if the flame from ignited specimens dies within an average of 25 seconds and the specimens drip flaming particles that burn only briefly, some of which ignite the cotton.

EXAMPLE 1

Preparation of Tetrabromobisphenol A: Bischloromethyl Oxetane Resin

Tetrabromobisphenol A (217.4g, 0.40 moles), potassium carbonate (121.6g, 0.88 moles) and 1.2 liters of dimethyl formamide were charged to a 2 liter flask. The flask was equipped with a stirrer, nitrogen inlet, thermometer and a condenser and was heated by an oil bath. The polymerization reaction was carried out in a nitrogen atmosphere. With stirring, the above reaction mixture was heated to 120° C. Then 63.60 g. (0.41 moles) of bischloromethyl oxetane was added. This addition resulted in a slight exotherm, and the color of the reaction mixture changed from green to amber. Stirring and heating to a temperature of 130°–135° C. was continued for 5 hours. After standing overnight, the upper liquid layer was decanted and discarded. About 1 liter of dioxane was added to the residue and the mixture heated on the steam bath. This solution was then slowly added to about 5 liters of water in a Waring blender to precipitate the polymer. The polymer was collected by filtration and washed in the funnel with 5 portions of water and 2 portions of methanol. The dried polymer, a white, fluffy solid, was obtained in about 90% yield. The inherent viscosity in tetrachloroethane was 0.3.

EXAMPLE 2

Preparation of Tetrachlorobisphenol A:Bischloromethyl Oxetane Resin

Tetrachlorobisphenol A (36.61 g., 0.10 moles), potassium carbonate (30 g., 0.22 moles), 200 ml. of dimethyl formamide, and 15.65 g. (0.101 moles) of bischloromethyl oxetane were charged to a 500 ml flask equipped with a stirrer, thermometer, nitrogen inlet and a condenser. The flask was heated by means of an oil bath and the polymerization reaction carried out in a nitrogen atmosphere. The reaction mixture was stirred and heated to a temperature of 125°–135° C. for 3 hours. After cooling to room temperature, the upper liquid layer was decanted and discarded. Dioxane (250 ml.) was added to the residue, the mixture heated on the steam bath and slowly poured into 1.2 liters of water in a Waring blender. The precipitated polymer was collected by filtration and washed on the funnel with water and with methanol. The yield of polymer, a fluffy off-white solid, was 38 g. The inherent viscosity in tetrachloroethane was 0.35.

EXAMPLE 3

Five (5) g of the tetrachlorobisphenol A: bischloromethyloxetane resin as prepared in Example 2 was dissolved in 18 ml. of trichloroethylene. Stannic chloride-acetonitrile complex (0.1 g.) was dissolved in 3 ml. of tetrahydrofuran and added to the resin solution. This solution was knifecoated on both sides of a 0.08 mm thick polyethylene terephthalate film. The coating was cured by heating in an oven to 150° C. for 5 minutes. The coating was 0.003 mm to 0.006 mm dry thickness on both sides. The cured coating was unaffected by soaking in trichloroethylene. The coated polyester film was ignited. The burning film charred and did not drip. An uncoated film dripped blazing droplets when ignited.

EXAMPLE 4

A tetrabromobisphenol A: bischloromethyl oxetane resin was prepared as in Example 1. The resin had an inherent viscosity of 0.22. Coating solutions were prepared in dioxane using various curing agents as shown in Table I.

Table I

|  | A | B | C |
| --- | --- | --- | --- |
| TBBPA:BCMO | 3.1 g (0.005 equiv.) | 6.2 g (0.01 equiv.) | 6.2 g. (0.01 equiv.) |
| Dioxane | 15 ml. | 30 ml. | 30 ml. |
| CURING AGENTS |  |  |  |
| Trimellitic anhydride | 0.9 g (0.0047 m.) | — | — |
| 2,5-Dibromo-terephthalic acid | — | 1.6 g (0.005 m) | — |
| Phenyl phosphonic acid | — | — | 0.8 g (0.005 m) |
| Cure | 1½ hrs. at 180° C. | 1½ hrs. at 180° C. | 1 hour at 180° C. |

The resin solutions were coated on both sides of 0.08 mm polyethylene terephthalate film and cured under the conditions shown. The cured coatings were approximately 0.004 mm. thick on each side. In all cases the cured coatings were not affected by soaking in trichloroethylene. All three of the coated films charred and did not drip when ignited.

EXAMPLE 5

A coating solution was prepared by dissolving 5 grams of tetrabromobisphenol A: bischloromethyl oxetane resin, prepared as in Example 1, in 18 ml. of trichloroethylene. Stannic chloride-acetonitrile complex (0.1 gram) was dissolved in 3 ml. of tetrahydrofuran and added to the resin solution. The resulting solution was coated on the following substrates: nylon 6,6 film; polyethylene film; polycarbonate film; polystyrene film; polyurethane film; non-woven polyester web; and spun bonded polyolefin (available commercially under the name TYVEK, a tradename of Dupont). All of the coated films charred and did not drip when ignited. Uncoated films dripped flaming droplets in various degrees when ignited under the same conditions.

EXAMPLE 6

Tetrabromobisphenol A: bischloromethyl oxetane resin was prepared as in Example 1 and dissolved in sufficient tetrahydrofuran to provide a twenty percent by weight solution. Stannic chloride-acetonitrile complex was added to an amount of methyl ethyl ketone just sufficient to dissolve the complex. The TBBPA:BCMO solution was then stirred while 0.5 percent by weight of the curing agent was poured in. This resulting solution was then coated onto one side of a strip of a 0.08 mm thick polyethylene terephthalate film to a wet coating thickness of 0.03 mm. The coated film was then dried and cured in a 150° C. oven for 10 minutes. This coated film was then held vertically over a Bunsen burner flame to test for ease of ignition and flame propagation. The sample charred and did not drip when ignited. An oxygen index test of the film indicated that the film had an L.O.I. value of 26.

EXAMPLE 7

A coating solution was prepared as in Example 6. This solution was coated onto a strip of flame retardant polyester (PET) film (commercially available from the 3M Company under the trademark "SCOTCHPAR" BRAND Type 7350 flame retardant polyester film) to a wet thickness of 0.015 mm with a No. 8 Mayer bar. After five minutes of air drying, the coated film was turned over and a coat was applied to the film's uncoated side. This double-coated film was then cured in a 150° C. oven for 5 minutes. The resulting dry coating thickness was a total of about 0.003 mm thick for the two sides. This sample was held in the flame for the time periods specified in Underwriters' Laboratories Subject No. 94 flammability testing section. After the two specified ignition attempts, the two side coated sample extinguished in a sufficiently short time to merit an SE-O (now V-O) rating. The uncoated film did not achieve an SE-O rating under the same conditions.

EXAMPLE 8

A coating solution was prepared as in Example 6. The solution was coated onto both sides of a strip of 0.15 mm thick polyethylene terephthalate film with a No. 24 Mayer bar. This coated film was cured for 5 minutes in a 150° C. oven. The two-sided total coating thickness was measured at 0.015 mm. This coated film was then tested according to Underwriters' Laboratories Subject No. 94 for flammability. The performance of the sample during the two ignition periods indicated the film achieved an SE-O rating. An uncoated film could not achieve the SE-O (now V-O) rating.

EXAMPLE 9

Films of polyethylene terephthalate (PET) and SCOTHPAR Brand flame retardant polyester about 0.03 mm thick were coated on one side using a No. 24 Mayer bar with a coating solution prepared as in Example 6. The coated films were air dried and a second coat was applied on top of the first coat. After air drying a second time, a third coat of TBBPA:BCMO was applied on top of the second coat of the PET substrate. Next both samples were cured in a 150° C. oven for five minutes. The samples were then tested according to the Underwriters' Laboratories Subject No. 94 Flammability Testing. Both of the samples, PET with a 0.02 mm coat and "SCOTCHPAR" polyester with a 0.015 mm coat, achieved an SE-O (now V-O) rating. Untreated film could not achieve the SE-O rating.

EXAMPLE 10

A coating solution was prepared as in Example 5. This solution was coatd on a flame retardant film of a copolyester resin derived from terephthalic acid, ethylene glycol, and 3,3-bis[2,4,6-tribromophenoxymethyl] oxetane having a theoretical bromine content of about 10%.

The copolyester polymer was prepared as follows:

A two-gallon resin kettle capable of operating under pressure and vacuum was used. Charged to the kettle were: terephthalic acid, 3350 g.; ethylene glycol, 1880 g., ; 3,3-bis[2,4,6-tribromophenoxymethyl] oxetane, 705 g.; zinc acetate dihydrate, 0.91 g; antimony oxide, 0.91 g.; and lithium acetate, 0.23 g. The procedure used was similar to that for conventional ethylene terephthalate polymerization. Over a period of approximately 2 hours, the kettle was heated to 256° C. The kettle pressure was kept at about 50 psi as the water which evolved was removed from the system. The pressure was then released slowly and vacuum was applied to the kettle. Polymerization was carried out at 275°–280° C. for about 2 hours. The torque load on the stirrer increased to the normal endpoint value for polyethylene terephthalate, at which time vacuum was released and the polymerization was terminated. The resulting resin had an inherent viscosity of 0.58 (½% solution in phenol/tetrachloroethane) and a melting point of about 237°–240° C. The inherent viscosity in a ½% solution in trifluoroacetic acid would also be about 0.58.

The copolyester resin was then extruded into a 9 mil (0.023 cm) cast web using a 2.5 cm extruder. Samples of the cast web were biaxially oriented 3 × 3 to give a 1 ml (0.0025 cm) film.

The L.O.I. (glass-wrapped) value of this film was 29. Comparable polyethylene terephthalate film had a value of 22.

| | |
|---|---|
| Break strength | 1.46 × 10³ kg/sq. cm (20.8× 10³ psi) |
| Break elongation | 115 % |
| Density | 1.47 g/cc. |
| Melting point (Mettler) | 240° C. |

The biaxially oriented copolyester film was coated with the coating solution of Example 5 to provide a cured coating about 0.002 mm thick on both sides of the film. The coated film had a L.O.I. of 36.

A similar film having a 0.002 mm thick coating on only one side had an L.O.I. of 32.

What is claimed is:

1. A char-forming, flame-retardant polymeric composite sheet comprising a flexible polymeric substrate having adhered thereto and substantially coextensive with at least one major surface thereof the char-forming, flame retardant coating of a composition comprising
  (a) a condensation polymer consisting essentially of repeating units having the formula

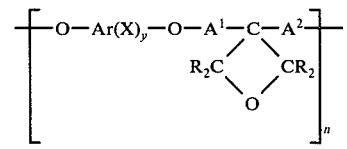

wherein
  Ar is a monocyclic or bicyclic aromatic nucleus,
  X is halogen,
  y is an integer from 1 to 8,
  $A^1$ and $A^2$ are lower aliphatic radicals containing 1 to 6 carbon atoms,
  R is independently hydrogen or lower alkyl of 1 to 6 carbon atoms, and
  n is an integer representing the degree of polymerization and is selected to provide said polymer with an inherent viscosity, determined with a 0.5 weight % solution in 1,1,2,2-tetrachloroethane of at least 0.1,
  (b) a crosslinking agent for said polymer comprising stannic chloride-acetonitrile complex, and
  (c) solvent for said polymer.

2. A composite sheet according to claim 1 wherein said condensation polymer consists essentially of repeating units of the formula

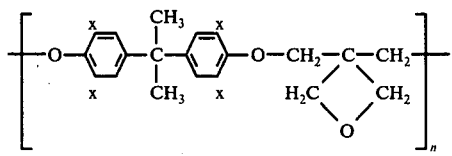

wherein x is chlorine or bromine, and n is an integer which represents the degree of polymerization and is selected to provide said copolymer with an inherent viscosity, determined with a 0.5 wt. % solution in 1,1,2,2-tetrachloroethane of at least 0.1.

3. A composite sheet according to claim 1 wherein said solvent comprises tetrahydrofuran.

4. A composite sheet according to claim 1 wherein said solvent comprises trichloroethylene.

5. A char-forming, flame-retardant polymeric composite sheet comprising a flexible polymeric substrate having adhered thereto and substantially coextensive with at least one major surface thereof a char-forming, flame-retardant coating, said coating comprising a crosslinked condensation polymer, said polymer selected from the group consisting of tetrabromobisphenol A: bischloromethyl oxetane and tetrachlorobisphenol A:bischloromethyl oxetane.

6. A polymeric sheet according to claim 5 wherein said polymeric substrate is a polyester film.

7. A polymeric sheet according to claim 6 wherein said polyester film is a flame retardant film.

8. A polymeric sheet according to claim 7 wherein said flame retardant film is a copolyester of terephthalic acid, ethylene glycol and 3,3-[bis-2,4,6tribromophenoxymethyl] oxetane containing about 10 weight percent of bromine.

9. A polymeric sheet according to claim 5 wherein said polymeric substrate is a woven or nonwoven fiber web.

* * * * *